United States Patent [19]

Broemer et al.

[11] 3,847,624
[45] Nov. 12, 1974

[54] FLUOROPHOSPHATE OPTICAL GLASS
[75] Inventors: Heinz Broemer, Hermannstein; Norbert Meinert, Wetzlar, both of Germany
[73] Assignee: Ernst Leitz GmbH, Wetzlar, Germany
[22] Filed: June 4, 1973
[21] Appl. No.: 366,292

[30] Foreign Application Priority Data
June 26, 1972 Germany............................ 2231238

[52] U.S. Cl.................. 106/47 Q, 65/136, 65/137, 106/47 R
[51] Int. Cl............................. C03c 3/18, C03c 3/00
[58] Field of Search........... 106/47 Q, 47 R; 65/136, 65/137

[56] References Cited
UNITED STATES PATENTS

| | | | |
|---|---|---|---|
| 3,508,937 | 4/1970 | Bromer et al...................... | 106/47 R |
| 3,656,976 | 4/1972 | Izumitani et al.................. | 106/47 Q |
| 3,492,136 | 1/1970 | Bromer et al..................... | 106/47 Q |

Primary Examiner—Helen M. McCarthy
Attorney, Agent, or Firm—Erich M. H. Radde

[57] ABSTRACT

An improved fluorophosphate glass is produced by melting a mixture of alkali metal metaphosphates, alkaline earth metal metaphosphates, aluminum metaphosphate, alkali metal hydrogen fluoride, alkaline earth metal fluorides, and aluminum fluoride in predetermined amounts. Such a glass has the advantage over other fluoroborate glasses that it can be melted in larger batches than heretofore possible.

5 Claims, No Drawings

FLUOROPHOSPHATE OPTICAL GLASS

BACKGROUND OF THE INVENTION

1. Field of the Invention

The present invention relates to an improved fluorophosphate glass and more particularly to a fluorophosphate glass which can be manufactured in considerably larger batches than heretofore known fluorophosphate glasses, and to a process of manufacturing same.

2. Description of the Prior Art

Applicants' U.S. Pat. No. 3,508,937 discloses a fluorophosphate glass which is produced by melting a mixture consisting of a. 9–12 mol percent of the metaphosphates of the elements selected from the group consisting of lithium, sodium, potassium, magnesium, and aluminum;

b. 81–90 mol percent of fluorides of the elements selected from the group consisting of magnesium, calcium, strontium, barium, and aluminum, and c. 0.4–7 mol percent of at least one of the compounds selected from the group consisting of potassium arsenate, potassium fluorotitanate, potassium fluorozirconate, and potassium fluorotantalate;

with the proviso that d. a proportion of aluminum metaphosphate is always present to at least one-half of the phosphate proportion; and e. the calcium fluoride is always present at about one-half (+ or −10 percent) and the aluminum fluoride is always present at about one quarter of the proportion of fluorides.

Such fluorophosphate glasses have refractive indices $n_e$ between about 1.47 and about 1.53, dispersion values $v_e$ between about 75 and about 85, and a positive anomalous dispersion $\Delta v_e$.

Such fluorophosphate glasses are of particular interest because of their anomalous partial dispersion since such dispersion enables the secondary spectrum to be corrected in calculating the optical values. They have, however, the disadvantage that they cannot properly be melted in larger batches and cannot readily be worked up to blanks or molded pieces of larger dimensions as required, for instance, for producing lenses for large objectives.

SUMMARY OF THE INVENTION

It is one object of the present invention to provide a fluorophosphate glass of about the same optical parameters as those of the known fluorophosphate glasses but having a substantially lesser tendency to crystallize than said known glasses so that they can be melted in considerably larger batches and can be worked up to substantially larger blanks or molded pieces than said known glasses.

Another object of the present invention is to provide a simple and effective process of manufacturing such novel and improved fluorophosphate glasses.

Other objects and many of the attendant advantages of the present invention will become apparent to those skilled in the art from the following specification taken in conjunction with the Tables recited in the example and in the claims annexed hereto.

According to the present invention the fluorophosphate glass of the desired optical parameters, i.e., of a refractive index $n_e$ of about 1.47 to about 1.53 and an Abbe number $v_e$ of about 75 to about 85 with a positive anomalous partial dispersion, is produced by melting a mixture consisting of 2.7 mol percent of an alkali metal metaphosphate;

6.5 mol percent of a mixture of alkaline earth metal metaphosphates consisting of 4.4 mol percent of magnesium metaphosphate, 1.0 mol percent of calcium metaphosphate, and 1.1 mol percent of barium metaphosphate;

4.0 mol percent of aluminum metaphosphate;

8.2 mol percent of an alkali metal hydrogen fluoride;

51.8 mol percent of a mixture of alkaline earth metal fluorides consisting of 9.9 mol percent of magnesium fluoride, 23.8 mol percent of calcium fluoride, 8.7 mol percent of strontium fluoride, and 9.4 mol percent of barium fluoride; and 26.8 mol percent of aluminum fluoride.

Such a mixture can be melted in relatively large batches and the resulting glass melt can be worked up to pieces of raw glass of relatively large dimensions.

Preferably the alkali metal metaphosphate used in producing such a glass is sodium metaphosphate and the alkali metal hydrogen fluoride is potassium hydrogen fluoride.

As stated above, it is a noteworthy advantage of the fluorophosphate glass according to the present invention that the raw glass mixture can be worked up to blanks or molded pieces of larger dimensions than heretofore possible. As a result thereof the resulting glass can directly be used for manufacturing highly valuable optical structural elements in a considerably less expensive manner than heretofore possible.

DESCRIPTION OF THE PREFERRED EMBODIMENTS

A preferred example of a glass according to the present invention has the composition in mol percent as well as in weight percent, as given in the following Table 1.

TABLE 1

| Component | Weight % | Mol % |
|---|---|---|
| $NaPO_3$ | 2.5 | 2.7 |
| $Mg(PO_3)_2$ | 7.4 | 4.4 |
| $Ca(PO_3)_2$ | 1.8 | 1.0 |
| $Ba(PO_3)_2$ | 3.0 | 1.1 |
| $Al(PO_3)_3$ | 9.7 | 4.0 |
| $MgF_2$ | 5.7 | 9.9 |
| $CaF_2$ | 17.3 | 23.8 |
| $SrF_2$ | 10.2 | 8.7 |
| $BaF_2$ | 15.4 | 9.4 |
| $AlF_3$ | 21.0 | 26.8 |
| $KHF_2$ | 6.0 | 8.2 |

The optical parameters of the resulting glass are as follows:

$n_e$ = 1.4875
$v_e$ = 81.4
$\Delta v_e$ = +18
$\vartheta_g$ = 0.4769

In order to more clearly characterize said preferred glass according to the present invention its chemical components are given in the following Table 2 as oxides and fluorides, whereby the metaphosphates are calculated as phosphorus pentoxide and as metal oxide components while the potassium hydrogen fluoride component is given calculated as potassium fluoride.

TABLE 2

| Component | %, by weight |
|---|---|
| $Na_2O$ | 0.8 |
| MgO | 1.7 |
| CaO | 0.5 |
| BaO | 1.6 |
| $Al_2O_3$ | 1.9 |
| $P_2O_5$ | 18.2 |
| KF | 4.7 |
| $MgF_2$ | 5.8 |
| $CaF_2$ | 17.5 |
| $SrF_2$ | 10.3 |
| $BaF_2$ | 15.6 |
| $AlF_3$ | 21.4 |

A glass component mixture according to the present invention in which the sum of the fluorides of magnesium, strontium, and barium is about equal to the amount of aluminum fluoride, each component being calculated in mol percent, and in which part of the bivalent and trivalent or, respectively, complex fluorides is replaced by a monovalent hydrogen fluoride, preferably potassium hydrogen fluoride, has proved to be of considerable advantage especially with respect to its tendency to crystallize, to its homogeneity as well as to its freedom of bubbles, schlieren, streaks, and other optical inhomogeneities.

Of course, the present invention is not limited to the single example given hereinabove. It comprises also such compositions in which the above mentioned cations are replaced by cations of the same group of the Periodic System of Chemical Elements.

The novel glass according to the present invention differs in principle from the fluorophosphate glasses of U.S. Pat. No. 3,508,937 by the presence of calcium, barium, and strontium metaphosphate, the presence of an alkali metal hydrogen fluoride, and the absence of potasium arsenate, potassium fluorotitanate, potassium fluorozirconate, and potassium fluorotantalate. The amount of magnesium metaphosphate and also that of calciumfluoride is considerably lower than that of the glass composition of said U.S. Pat. No. 3,508,937. These and the other minor differences in the composition of the glass according to the present invention and the known glasses are responsible for the better workability in large batches, the reduced tendency of the melt to crystallize, the better homogeneity, and the freedom of the melt from bubbles, striations, and other optical inhomogeneities.

The improved fluorophosphate glass according to the present invention is produced by melting down the well mixed ingredients of the mixture of components in batches of about 1.5 kg in a platinum crucible at a furnace temperature of about 1,000° C. The melt is then refined at a temperature of about 1,180° C. for 3 minutes. Thereafter, the melt is cooled to about 730° C. with constant stirring and then poured into carbon molds which have been preheated to about 425° C. After the glasses have been cast into the preheated molds, they are cooled down in the usual manner to room temperature within 24 hours.

We claim:

1. A fluorophosphate glass produced by melting a mixture of glass components consisting of
 a. 2.7 mol percent of an alkali metal metaphosphate;
 b. 6.5 mol percent of alkaline earth metal metaphosphates composed of
  4.4 mol percent of magnesium metaphosphate,
  1.0 mol percent of calcium metaphosphate, and
  1.1 mol percent of barium metaphosphate;
 c. 4.0 mol percent of aluminum metaphosphate;
 d. 8.2 mol percent of an alkali metal hydrogen fluoride;
 e. 51.8 mol percent of alkaline earth metal fluorides composed of
  9.9 mol percent of magnesium fluoride,
  23.8 mol percent of calcium fluoride,
  8.7 mol percent of strontium fluoride, and
  9.4 mol percent of barium fluoride; and
 f. 26.8 mol percent of aluminum fluoride.

2. The fluorophosphate glass of claim 1, in which the alkali metal metaphosphate is sodium metaphosphate.

3. The fluorophosphate glass of claim 1, in which the alkali metal hydrogen fluoride is potassium hydrogen fluoride.

4. The fluorophosphate glass of claim 1, in which the alkali metal metaphosphate is sodium metaphosphate and the alkali metal hydrogen fluoride is potassium hydrogen fluoride.

5. In a process of producing a fluorophosphate glass comprising the steps of
 1. melting a mixture of glass components consisting of
  a. 2.7 mol percent of an alkali metal metaphosphate;
  b. 6.5 mol percent of alkaline earth metal metaphosphates composed of
   4.4 mol percent of magnesium metaphosphate,
   1.0 mol percent of calcium metaphosphate, and
   1.1 mol percent of barium metaphosphate;
  c. 4.0 mol percent of aluminum metaphosphate;
  d. 8.2 mol percent of an alkali metal hydrogen fluoride;
  e. 51.8 mol percent of alkaline earth metal fluorides composed of
   9.9 mol percent of magnesium fluoride,
   23.8 mol percent of calcium fluoride,
   8.7 mol percent of strontium fluoride, and
   9.4 mol pecent of barium fluoride; and
  f. 26.8 mol percent of aluminum fluoride;
 in a crucible at a furnace temperature of about 1,000° C.,
 2. homogenizing the melt at a temperature of about 1,180° C. for about 3 minutes,
 3. cooling the melt to about 730° C. with constant stirring,
 4. casting the stirred cooled melt into carbon molds preheated to about 425° C., and
 5. cooling down the cast glass to room temperature within 24 hours.

* * * * *